US006983722B2

(12) United States Patent
Tepper et al.

(10) Patent No.: US 6,983,722 B2
(45) Date of Patent: Jan. 10, 2006

(54) PET TREAT DISPENSER

(75) Inventors: Jacob Tepper, Boca Raton, FL (US); Steven Mendal, New York, NY (US); Dean Triandafellos, Freehold, NJ (US)

(73) Assignee: Petra Pet, Inc., Carlstadt, NJ (US)

( * ) Notice: Subject to any disclaimer, the term of this patent is extended or adjusted under 35 U.S.C. 154(b) by 122 days.

(21) Appl. No.: 10/723,303

(22) Filed: Nov. 25, 2003

(65) Prior Publication Data

US 2005/0121339 A1 Jun. 9, 2005

(51) Int. Cl.
*A01K 29/00* (2006.01)
*A63H 3/02* (2006.01)

(52) U.S. Cl. ........................ 119/709; 119/707; 446/73; 446/369; 446/376

(58) Field of Classification Search ................ 119/709, 119/707, 702, 708, 710, 711; 130/160; 446/369, 446/73, 376
See application file for complete search history.

(56) References Cited

U.S. PATENT DOCUMENTS

D141,700 S * 6/1945 Raport ...................... D24/199
2,711,052 A * 6/1955 Brayford ..................... 446/73
4,277,910 A * 7/1981 Kramer ....................... 446/73
5,000,171 A * 3/1991 Hofer ............................ 602/3
D322,469 S * 12/1991 Berger et al. .............. D21/604
5,433,643 A * 7/1995 Pratt .......................... 446/73
5,489,231 A * 2/1996 Leyser ....................... 446/302
5,733,166 A * 3/1998 Hoag .......................... 446/75
5,779,570 A * 7/1998 Bear .......................... 473/481
D412,583 S * 8/1999 Miller ....................... D24/199
5,975,980 A * 11/1999 Whiteneck .................. 446/327
6,155,905 A * 12/2000 Truax ......................... 446/330
6,350,169 B1 * 2/2002 Holt ........................... 446/327
6,422,912 B1 * 7/2002 Summers .................... 446/184
6,427,634 B1 * 8/2002 Mann ......................... 119/709
6,461,214 B1 * 10/2002 Lynch ......................... 446/73
6,470,830 B2 * 10/2002 Mann ......................... 119/709
6,676,478 B1 * 1/2004 Starner ....................... 446/369
6,699,100 B1 * 3/2004 Burns ......................... 446/369
6,739,933 B2 * 5/2004 Taylor ......................... 446/28
6,749,479 B2 * 6/2004 Vick ........................... 446/73
6,755,712 B2 * 6/2004 Morris ........................ 446/98
6,824,112 B2 * 11/2004 Lange ........................ 248/102
6,827,317 B1 * 12/2004 Maki Risaliti .............. 248/102
6,848,967 B2 * 2/2005 Kim ........................... 446/369

OTHER PUBLICATIONS

Doctors Forster & Smith, Feb. 2002, vol. 02-16-p. 130.

* cited by examiner

*Primary Examiner*—Yvonne R. Abbott
(74) *Attorney, Agent, or Firm*—Weingram & Associates, P.C.

(57) ABSTRACT

A pet treat dispensing system comprising a non-edible, interactive pet toy having fastening means therein for removably mounting and retaining an edible pet treat in an exposed position for easy access by a pet, wherein the treat is kept at a distance from stainable surfaces when the toy is in the upright position.

6 Claims, 14 Drawing Sheets

PET TREAT DISPENSER

BACKGROUND OF THE INVENTION

1. Field of the Invention

The present invention relates to pet treats and especially to means for dispensing edible pet treats in a manner to be attractive to dogs and other domestic pets.

2. Problem Presented

Edible pet treats made from rawhide, natural bone, or various other hard materials such as jerky, nylon, polyurethane, plastic and other synthetic materials are commonly used to satisfy a dog's instinctive urge to chew, reduce plaque build-up and massage gums. Additionally dogs, cats, and other domestic pets often play with non-edible toys. Examples of such toys are balls, ropes for throw and fetch, and plastic and plush toys with noise-making devices inside them which grunt or squeak when squeezed.

The problem presented by these toys is that pets have a desire and tendency to chew on items they come in contact with, which means a relatively short life span for any soft pet toy, such as plush or plastic toys with squeakers in them.

It would be desirable to extend the life of a pet plush toy by combining it with an attractive, edible pet treat that the pet would chew on and consume rather than pulling and chewing on the plush toy. Accordingly, there is a need for a toy which appeals to pets, is long-lasting, satisfies a pet's need to chew, and at the same time cleans the pet's teeth.

OBJECTS AND SUMMARY OF THE INVENTION

The present invention sets forth a pet treat dispensing system incorporating a non-edible, interactive pet toy and means in the non-edible pet toy for removably mounting or attaching an edible pet treat to place the edible treat in an exposed position so that it will be attractive to the pet and will be the pet's first choice for chewing. The attaching means allow for replacement of the edible pet treat to allow for a variety of treats and/or to extend the life of the toy by replacing the pet treat when it becomes worn or consumed, and, therefore less attractive for chewing than the toy would be.

Accordingly, it is an object of the present invention to provide a pet toy which has a means for mounting an edible pet treat in an exposed position to provide easy access for chewing by a pet.

Another object of the present invention is to provide a plush toy having a sound means or other pet attracting means which can be combined with an edible pet treat to provide a composite item for a pet, such as a dog or a cat, which will be attractive to the pet visually, for play purposes and from a consumption point of view.

It is another object of the present invention to provide a plush toy which is configured to hold large pieces of rawhide which can be used and consumed by a dog in preference to pulling, gnawing or chewing on the plush toy.

Another object of the present invention is to provide a plush toy and pet treat wherein the plush toy has means for removably mounting the pet treat.

Still another object of the present invention is to provide a plush toy for pets configured to removably hold a rawhide retriever roll to be consumed by a dog.

Yet another object of the invention is to provide a relatively durable and long-lasting toy which satisfies a dog's chewing urges and has play value for the dog.

A further object of the invention is to provide a fun pet treat dispenser which is relatively inexpensive, non-toxic, and which can accommodate a wide variety of pet treats that can be held and dispensed.

Yet another object of the invention is to provide a pet treat dispenser which has play value, is attractive, and which enables the pet owner to easily dispense pet treats.

A further object of the present invention is to provide a pet treat dispenser which retains a pet treat in a plush toy so as to reduce the contact of the edible treat with stainable surfaces in the home, such as rugs, carpets, or furniture.

It is another object of the present invention to provide a pet treat dispenser plush toy which can be used as a toy when there is no treat to dispense.

It is yet another object of the present invention to provide a plush toy which dispenses pet treats and which is durable and longer lasting than ordinary plush toys for pets.

A still further object of the invention is to provide a method for dispensing a pet treat by placing the treat in retainer means mounted to a plush toy.

Yet another object of the invention is to provide a method of dispensing pet treats in such a way that the treat is kept elevated and off the floor or furniture, by being securely held in a plush toy.

A further object of the invention is to provide a method of removably mounting an edible treat on a plush toy, which treat may be easily removed or replaced.

These and other objects are accomplished by providing a pet treat dispenser which is improved as compared to commercially available dispensers and pet toys, as it comprises a plush toy having fastening means for removably retaining a pet treat. In another aspect of the invention, there is disclosed a method of dispensing a pet treat by placing a treat in a plush toy having fastening means for removably retaining said pet treat.

These, and various other and further features and advantages of the invention will become apparent from the following detailed description, taken in conjunction with the accompanying drawings, which illustrate by way of example the principles of the invention.

BRIEF DESCRIPTION OF THE DRAWINGS

For a more complete understanding of the present invention, reference may be had to the detailed description of the preferred embodiments taken in connection with the accompanying drawings, in which.

Similar numerals refer to similar parts throughout the figures.

DESCRIPTION OF THE PREFERRED EMBODIMENT

Figure 1:
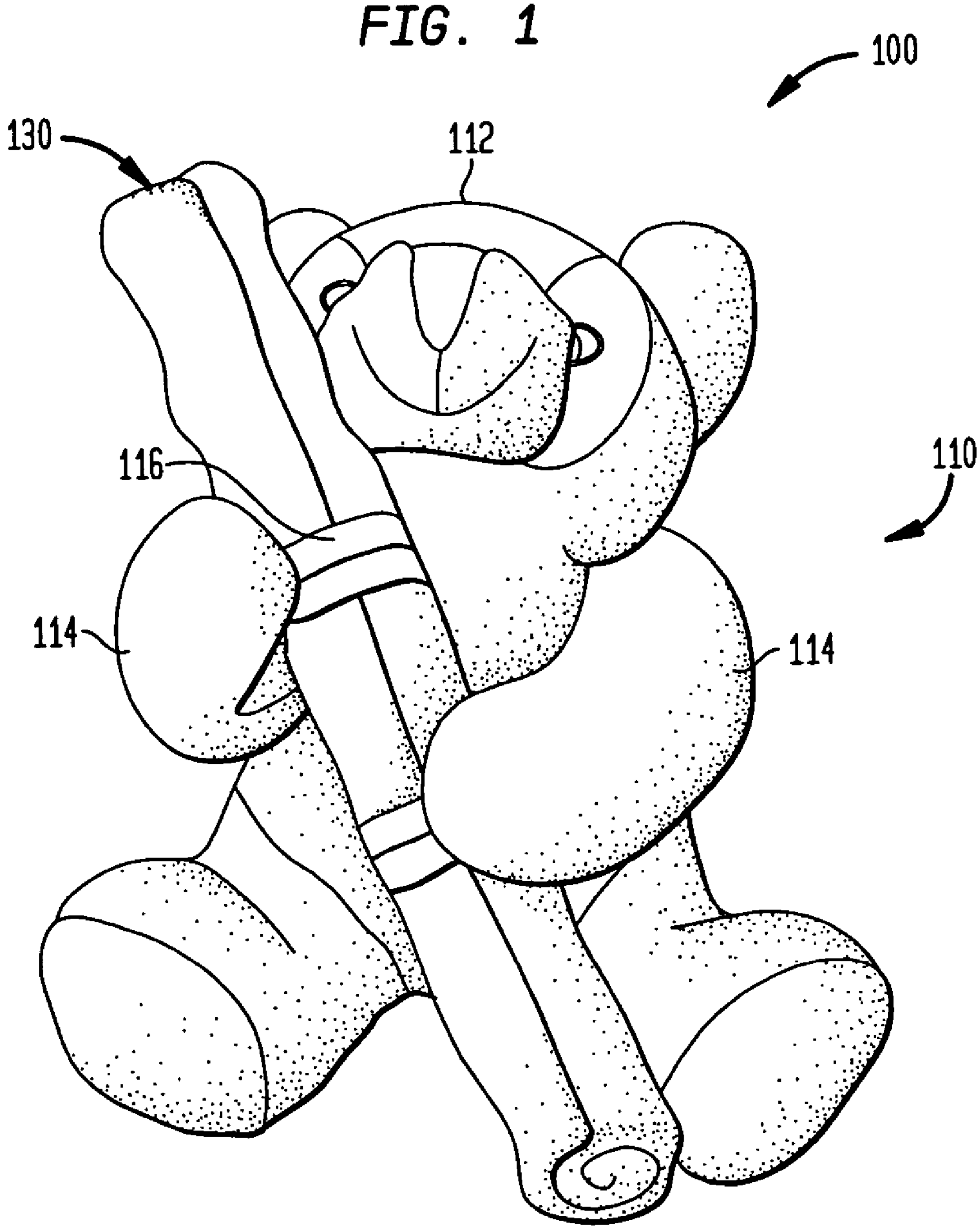
FIG. 1 is a front view of a pet treat dispenser according to the invention.
Figure 2:
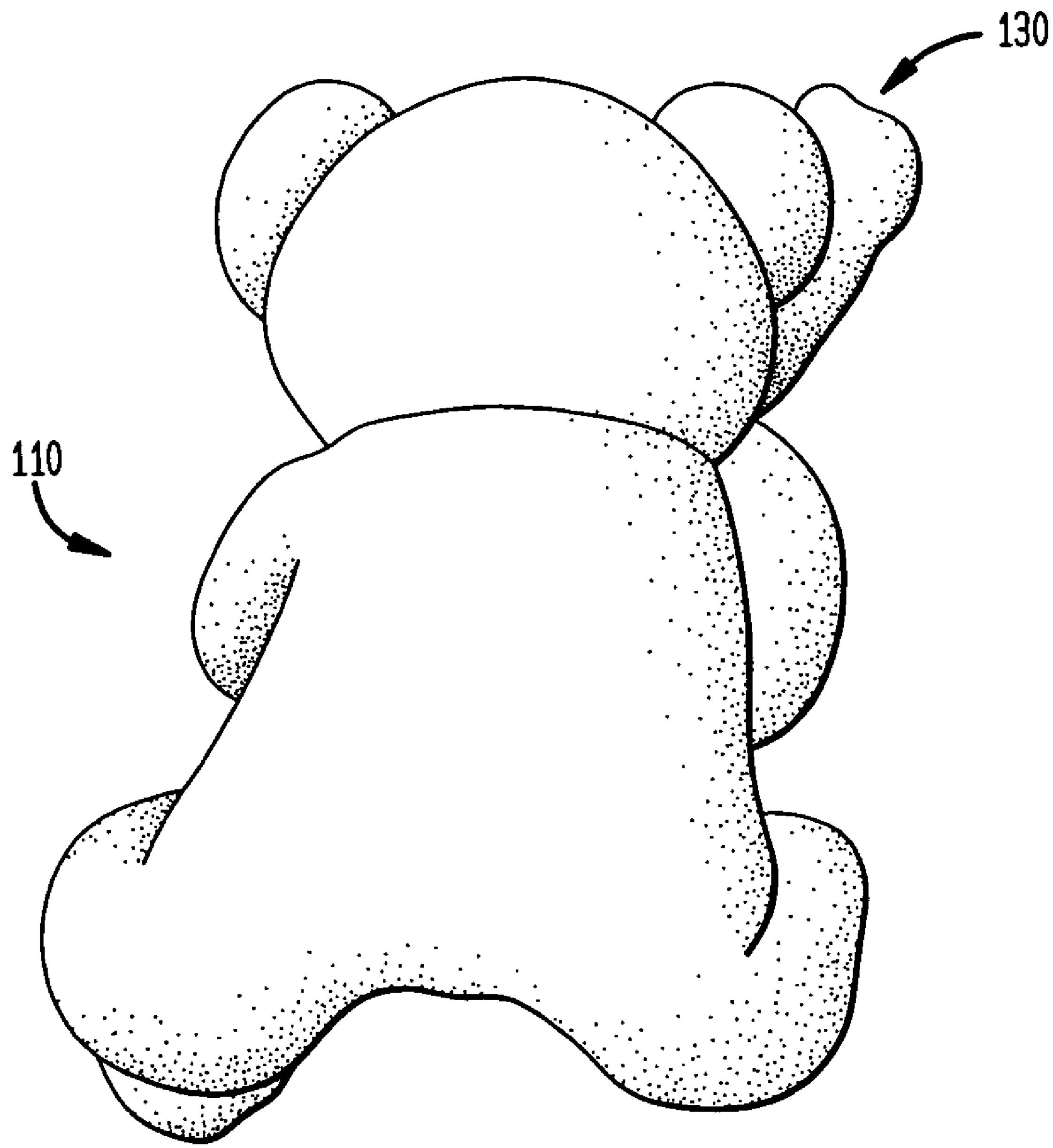
FIG. 2 is a back view of the pet treat dispenser of FIG. 1.
Figure 3:
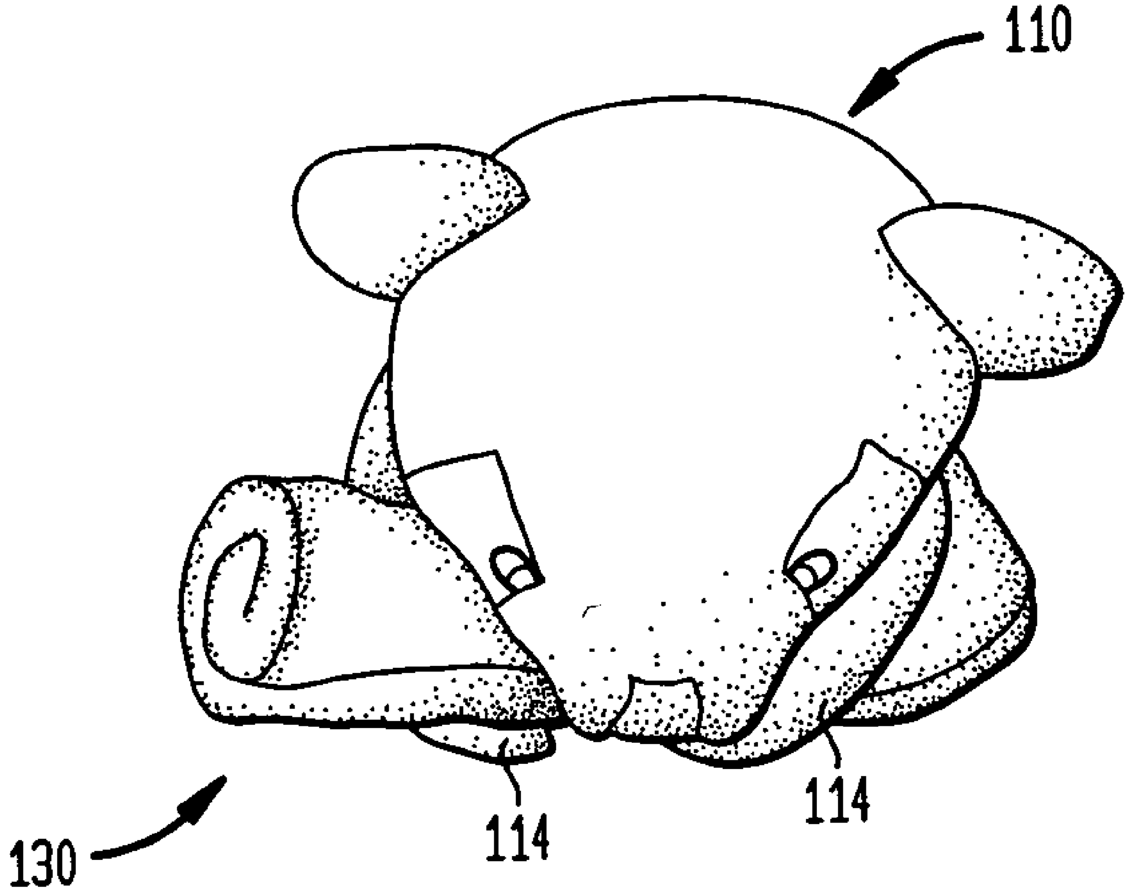
FIG. 3 is a top view of the pet treat dispenser of FIG. 1.
Figure 4:
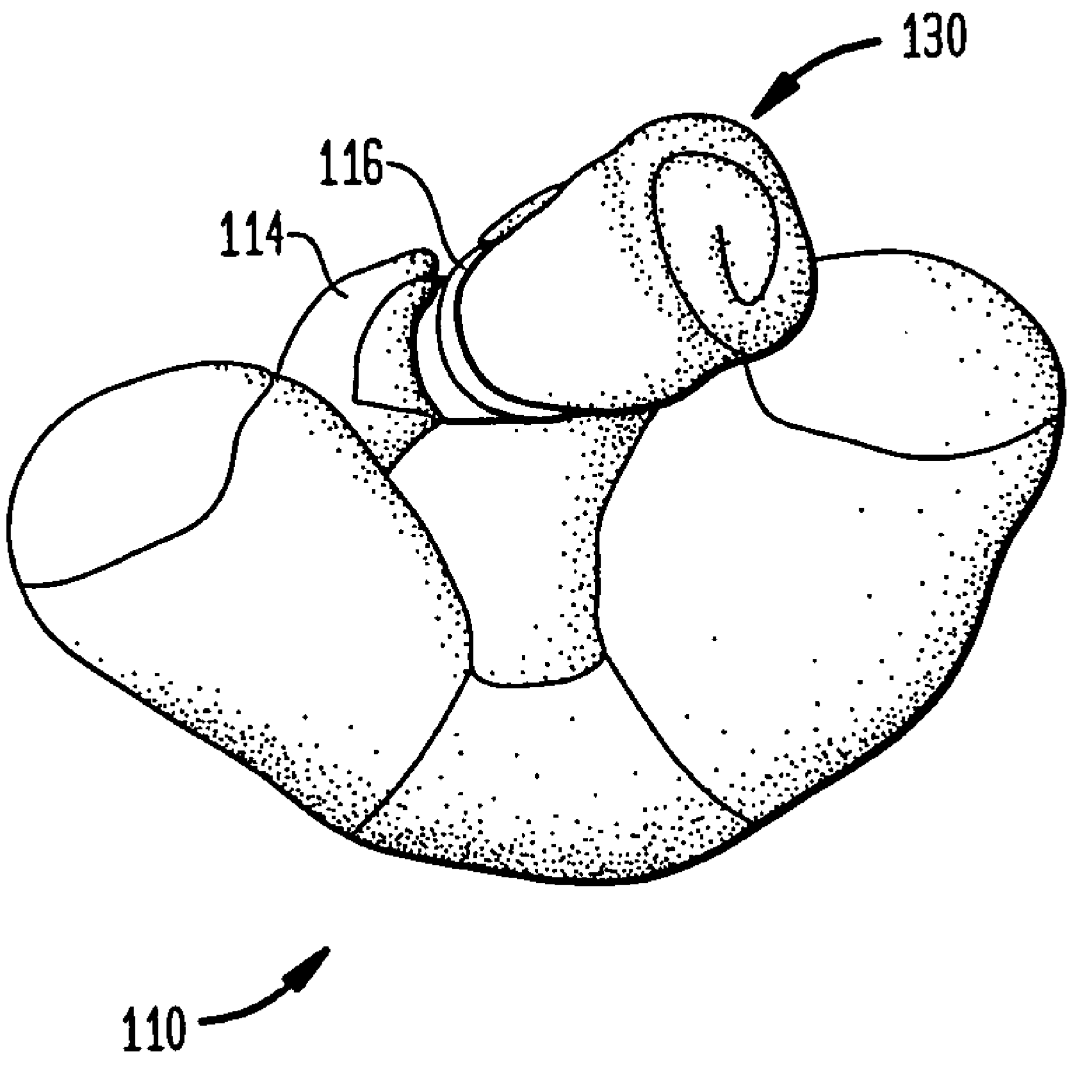
FIG. 4 is a bottom view of the pet treat dispenser of FIG. 1.
Figure 5:
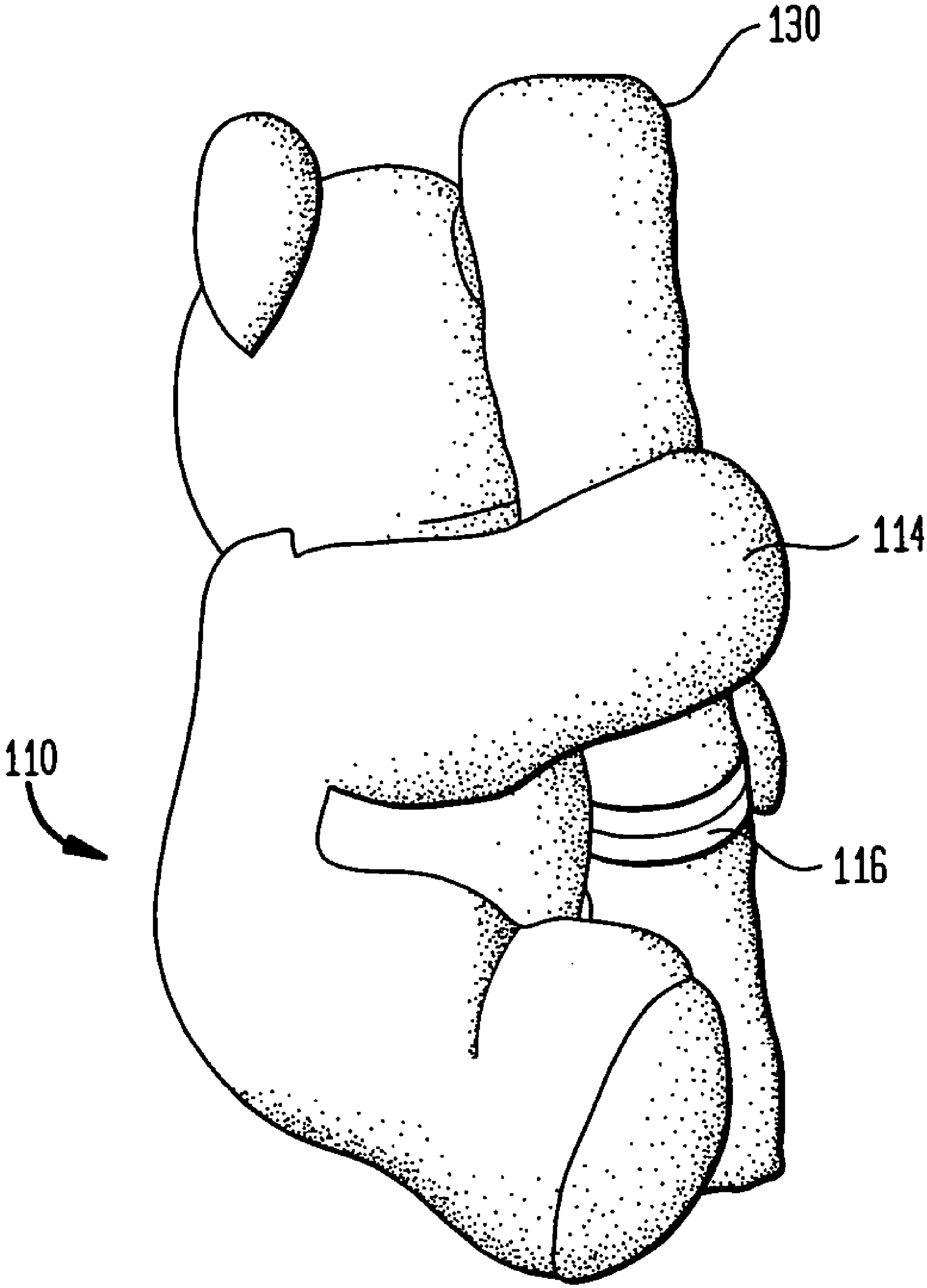
FIG. 5 is a right side view of the dispenser of FIG. 1.
Figure 6:
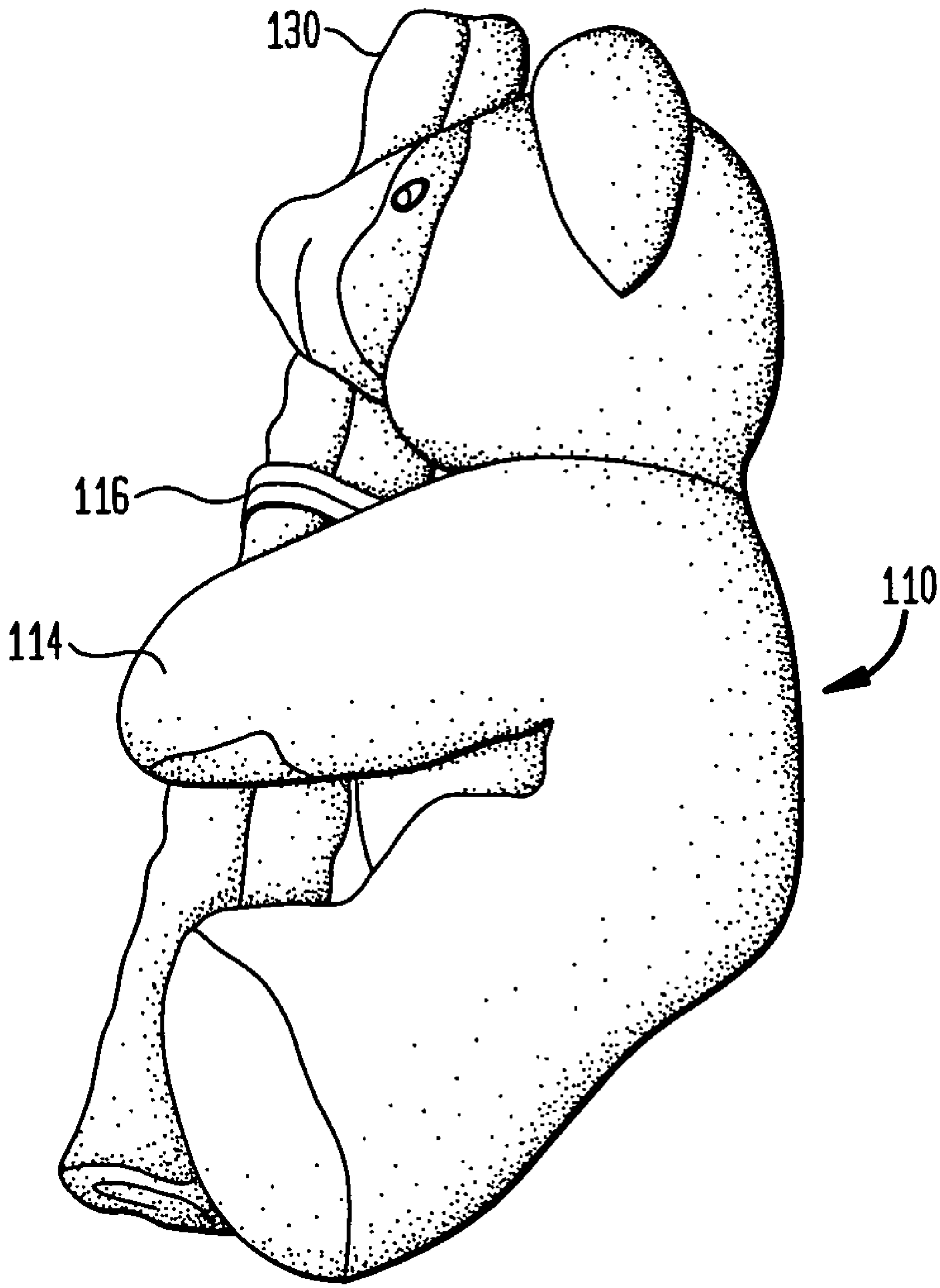
FIG. 6 is a left side view of the dispenser of FIG. 1.
Figure 7:
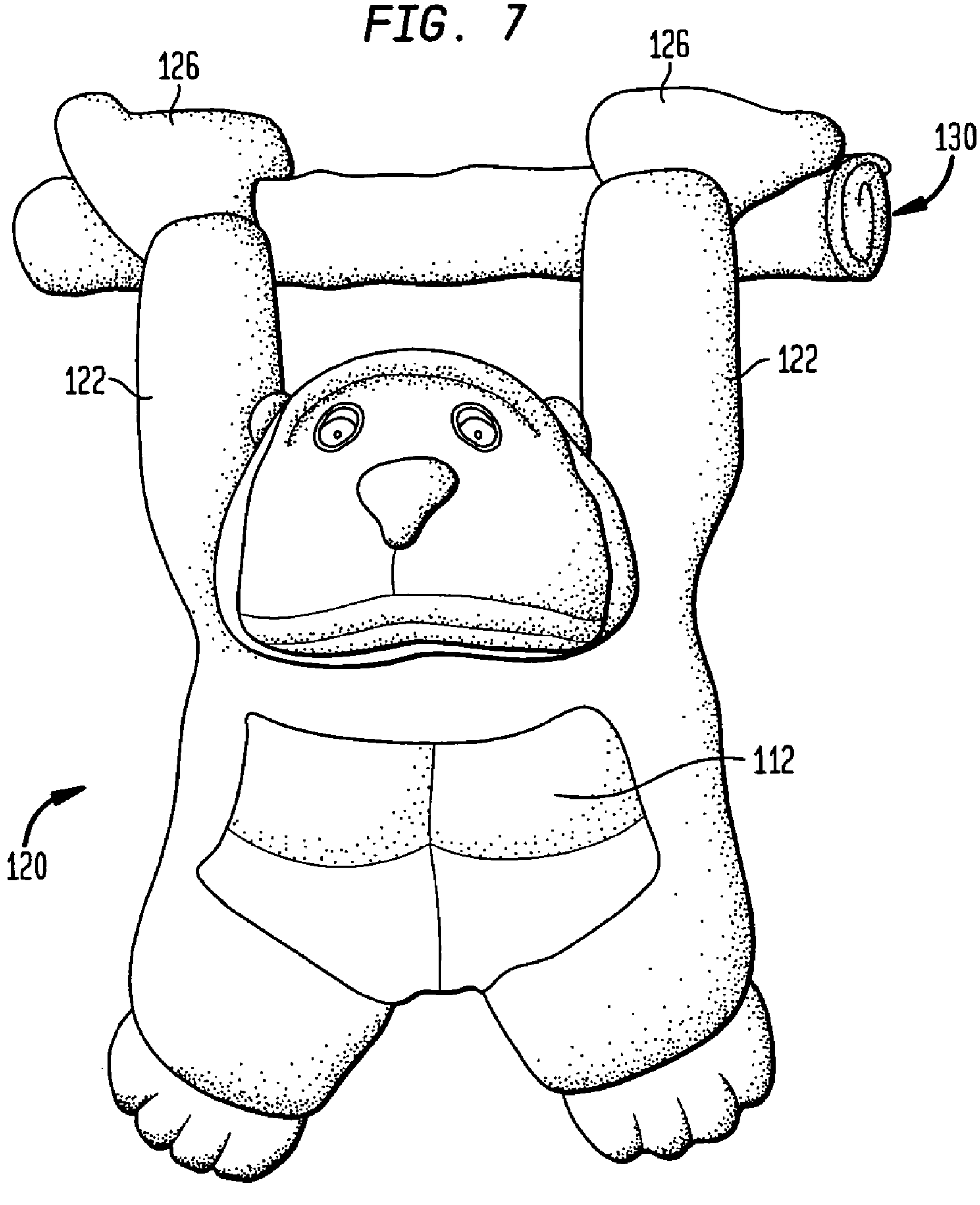
FIG. 7 is a front view of a second embodiment of a pet treat dispenser according to the invention.
Figure 8:
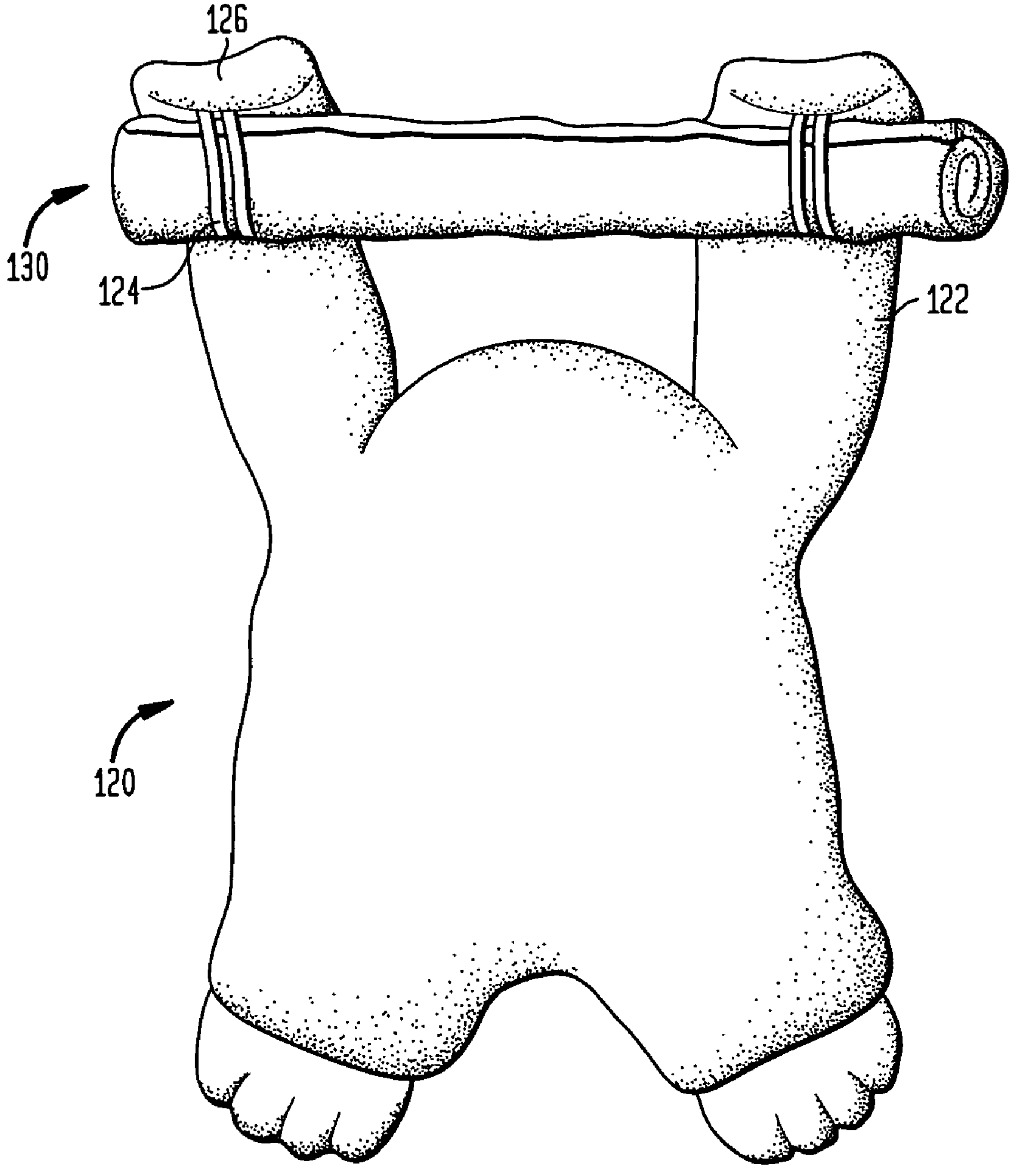
FIG. 8 is a back view of the pet treat dispenser of FIG. 7.
Figure 9:
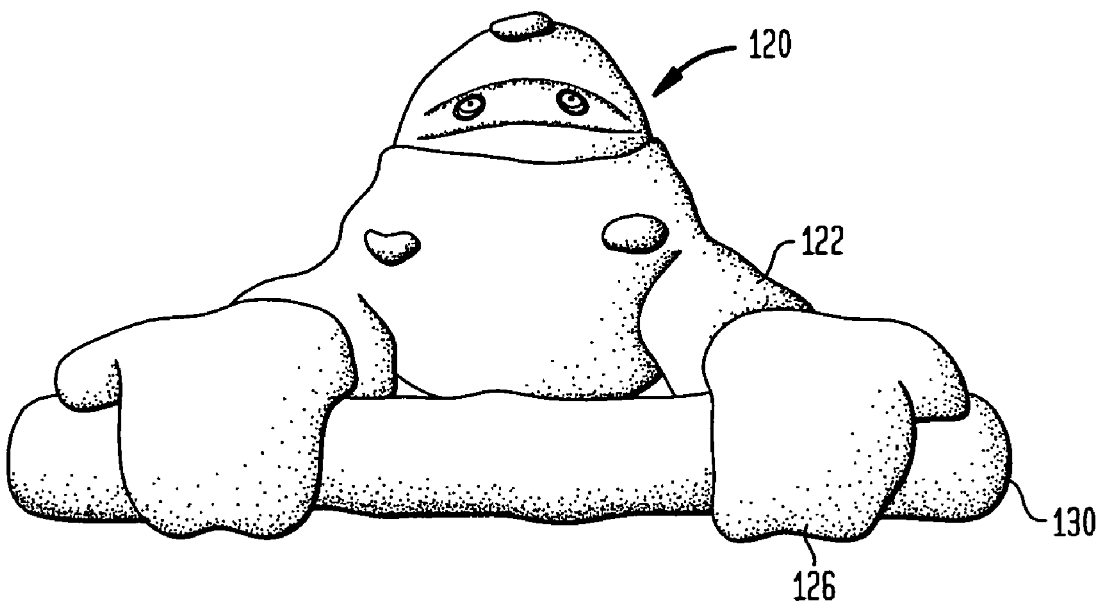
FIG. 9 is a top view of the pet treat dispenser of FIG. 7.
Figure 10:
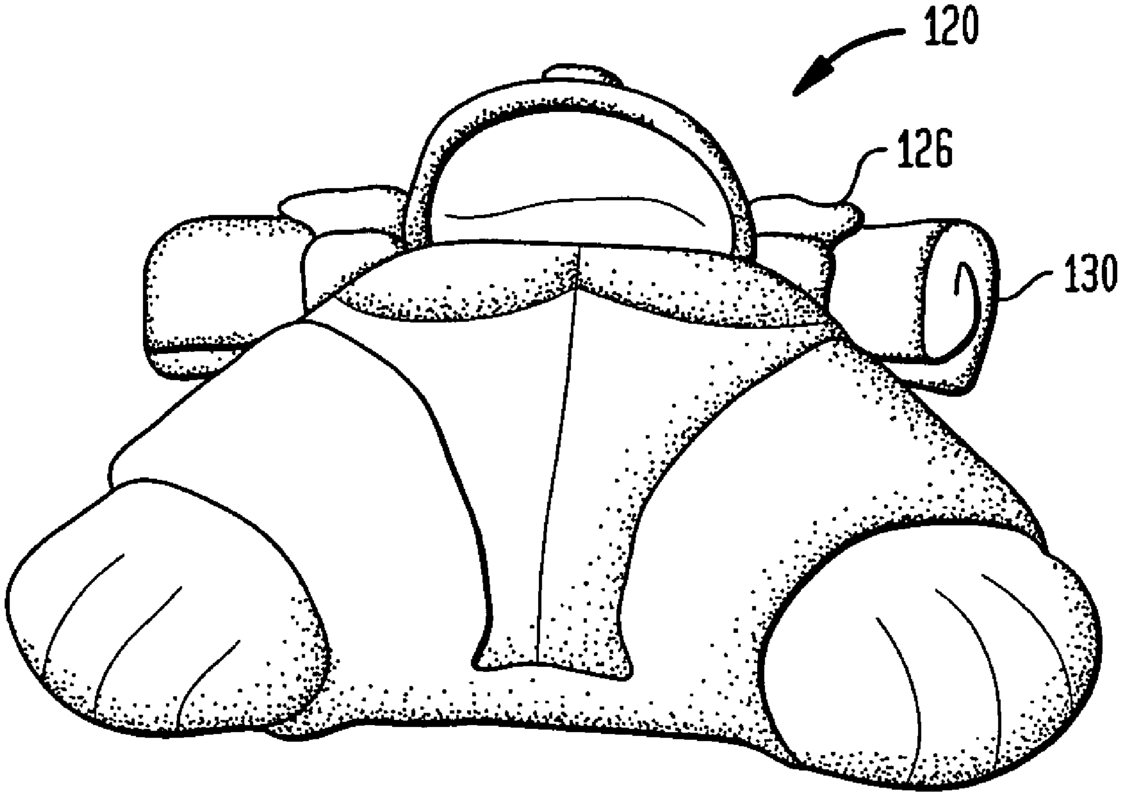
FIG. 10 is a bottom view of the pet treat dispenser of FIG. 7.
Figure 11:
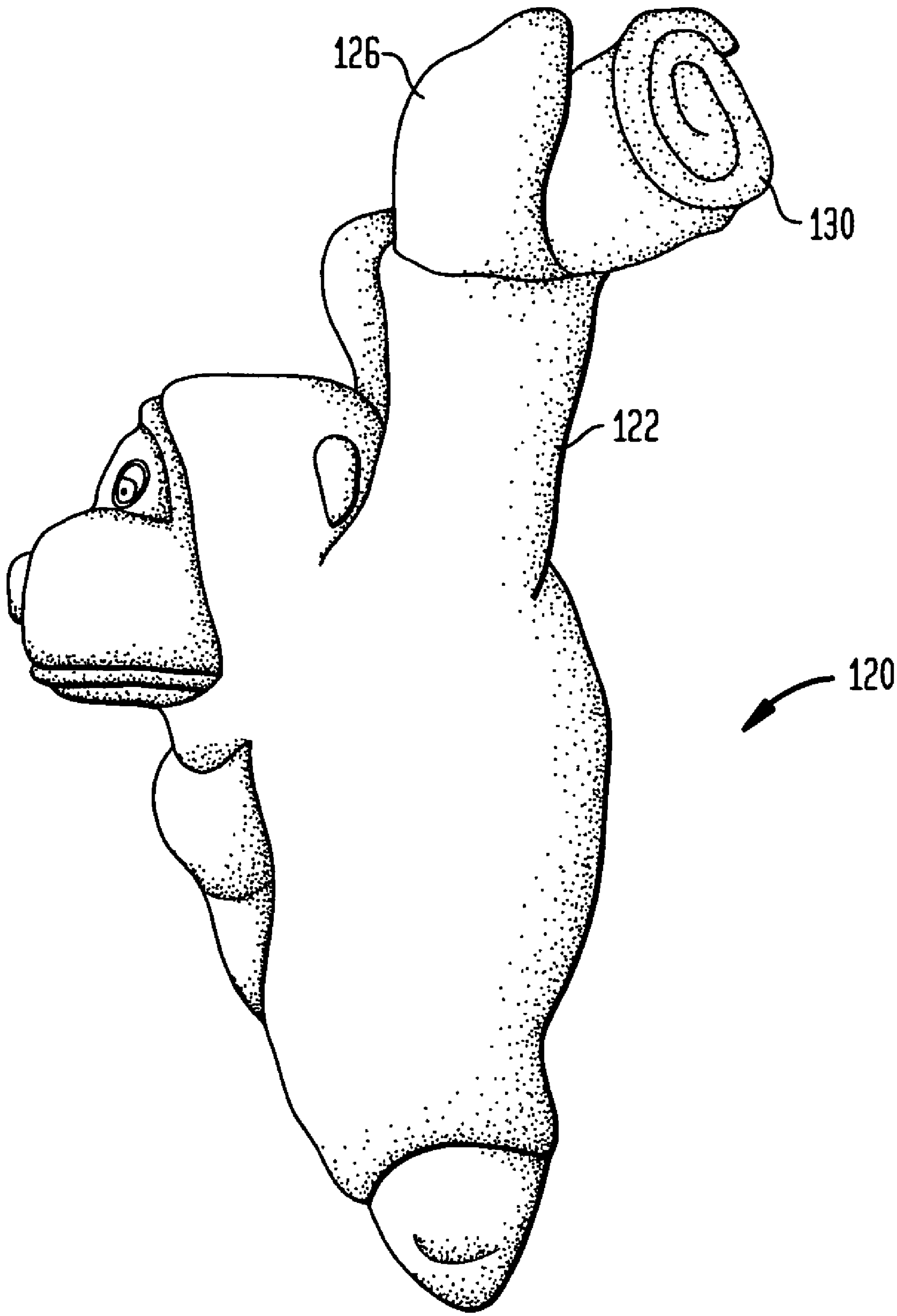
FIG. 11 is a right side view of the dispenser of FIG. 7.
Figure 12:
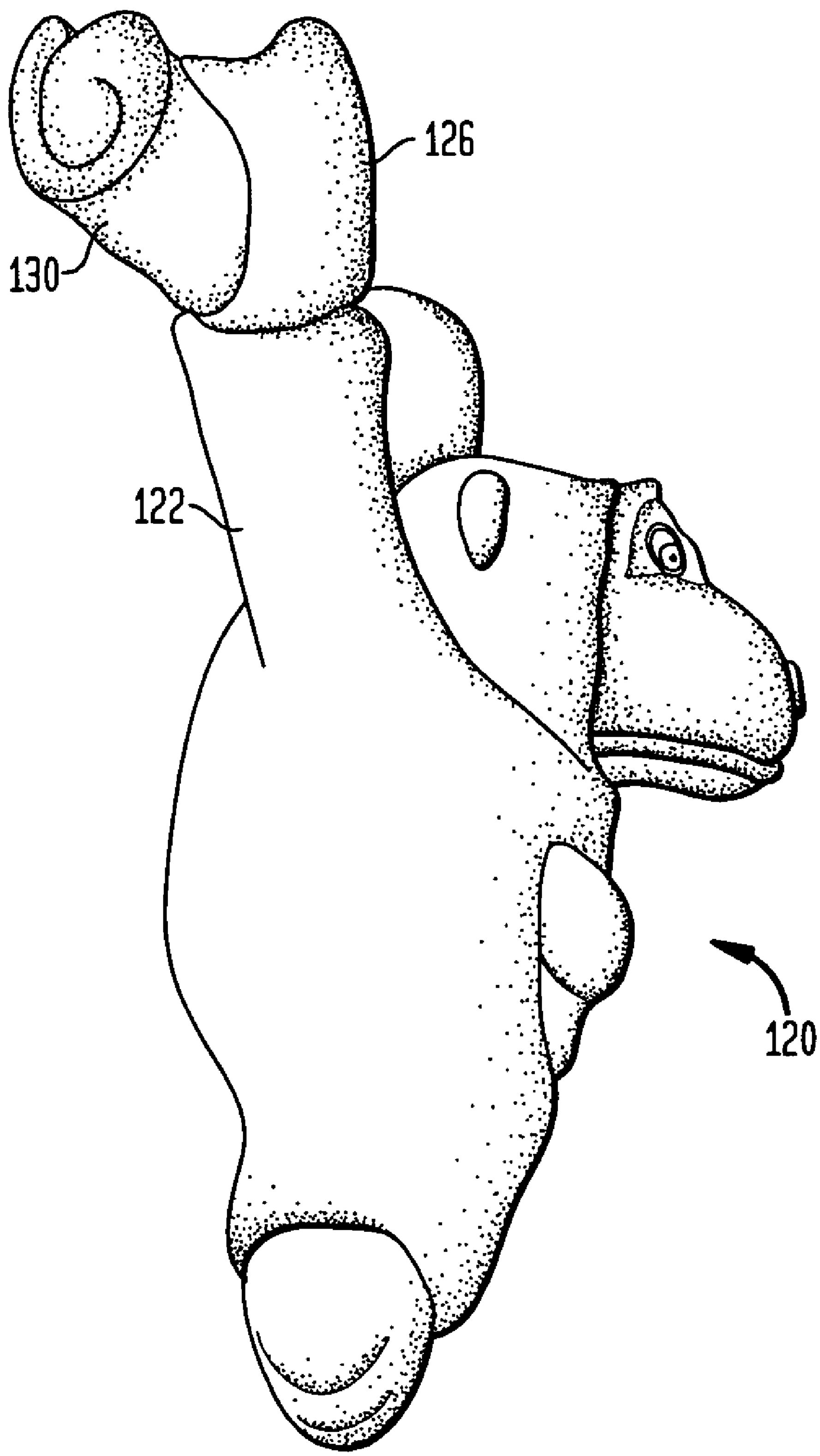
FIG. 12 is a left side view of the dispenser of FIG. 7.

As shown in the FIGS. 1 through 15, a pet treat dispenser, indicated generally by reference number 100, is made of a plush material, preferably in the shape of an animal. The figure is formed of a flexible, plush fabric outer covering that is stuffed with a resilient, densely packed stuffing or padding material. While not critical to the invention, it is clear that the pet treat dispenser may be made of suitable materials other than plush fabric, for instance, of rubber or plastic or combinations thereof, and may be shaped to any desired appearance and configuration to appeal to pets. For example, the dispenser may be in the configuration of balls, bones, rings, rolls, retrieving objects, twists, or any other actual, novelty, or abstract shape which will pique a pet's interest.

The drawings show a pet treat dispenser, indicated generally by reference numeral 100, which comprises a plush toy 110 such as a panda bear shown in FIGS. 1–6, or a monkey 120, shown in FIGS. 7–14. Referring now to FIGS. 1–6, the panda 110 has articulated arms 114, on which is fastened retainer means 116. It is contemplated that the retaining means 116 may be formed of any suitable material, such as elastic bands, rubber bands, nylon stickers or other elastic material, or adhesive means such as VELCRO®. All such materials must be flexible and soft enough not to damage the pet's teeth, and have no hard components which may detach or break into sharp fragments which the pet may ingest while playing or chewing on the treat.

The retaining means 116 is of sufficient length to encircle the pet treat at least once, and preferably is long enough to wrap around a pet treat two or more times to secure the pet treat in the arms of the plush toy treat dispenser. The retaining means are adjustable to fit virtually any size pet treat.

As shown in FIGS. 1–12, the elastic retaining means 116 form loops fastened to each hand, preferably on the palm side, or to other parts of the pet treat dispenser, so as to hold one, two, or more separate pet treats, for instance, to hold a pet treat in both hands, or to hold two pet treats, one in each hand. Retaining means 116 may also be formed to connect both arms 114 of the plush toy, not shown, so as to hold a pet treat in both arms.

The first and second ends of the elastic retaining means are fixedly attached either to the same anchor point on an appendage of the plush toy or to different anchor points. In use, the user stretches the elastic band to loop it around the pet chew so as to retain it in position.

One or multiple elastic loops may be attached to each palm of the toy. Providing multiple retaining means enhances the stability of the plush toy. As shown in FIGS. 1–6, one arm of the plush toy animal may be raised with respect to the second arm in a resting position, so that the elastic loops secured to the arms of the toy engage the pet treat to hold it in an upright position. The treat has a reclining orientation in the upright use position, with the treat disposed at an angle across the body of the toy figure. One end of the pet treat leans against one leg of the toy figure to stabilize the toy figure in the use position and to assist in supporting the toy in an upright position.

The pet treat is preferably a rolled rawhide pet chew treat 130 for dogs, or other animals. The pet treat is, of course, not limited to rawhide pet chews, but may comprise other types, configurations, and compositions. The pet treat 130 need not be a cylindrical retriever roll but may comprise a wide variety of treats as long as they are capable of being held within the retaining means 116 connected to the pet treat dispenser 100. As the arms 114 of the plush pet treat dispenser 100 are articulated, the arms 114 may be moved up, down, and sideways; or the arms 114 may be raised or lowered above and below the head or feet of the plush toy. The arms 114 of the plush toy 110 may assume different positions, thus enabling the pet treat 130 to be retained in different positions with the pet treat 130 exposed for easy access by the pet.

The pet treat, generally indicated at 130, preferably consists of a roll of rawhide which is preferably sized and dimensioned to be compatible with the size of the plush toy 110, 120, so that it can be, in effect, grasped or hugged by the toy 110, 120, so as to stabilize the pet treat 130 and, at the same time, still provide access to the pet for consumption. The pet can easily grab, chomp or gnaw, or pull and tug at the edible treat. Pet treats of different sizes and configurations may be placed and removably retained in the pet treat dispenser 100 by varying the length, width, and thickness of the retaining means 116, so as to hold pet treats 130 of varying sizes and shapes which are suitable for pets of different breeds and sizes. The pet treat 130 is ideally designed so that the pet can easily hold it in its mouth, but cannot easily swallow it whole.

The plush toy 110, 120, can be moved and manipulated with respect to the pet treat 130 so that the pet treat 130 is, in effect, held at a distance from any stainable surface when the plush toy 100 is placed in its normal resting position, therefore reducing the likelihood that the pet treat 130 will stain any nearby surface.

The pet treat 130 is readily detachable from the arm 114 for independent use by the pet, yet easily re-attachable for use with the toy 100.

As shown in FIG. 1, the weight of the pet treat secured to the toy figure assists in maintaining the toy stationary and stable.

FIGS. 7–12 show a second embodiment of the pet treat dispenser 100 of the invention. In this case, a plush toy in the shape of a monkey 120 is shown, in which each of the arms 122 is articulated. In this embodiment, each arm 122 has separate resilient, elastic retainer means 124 to hold the pet treat and to enable the hands 126 at the end of the arms 122 to wrap around and hold the pet treat 130. In this embodiment, the retaining means 124 comprises two elastic bands on each hand 126 to retain the pet treat 130.

Again, in this embodiment the pet treat 130 is shown as a cylindrical roll of rawhide chew. Needless to say, various other types of plush toys can be used as long as they are capable of attaching the pet treat 130 to the toy 120 and positioning the pet treat 130 so that it is retained at a distance from any stainable surface that the toy pet treat dispenser 100 is placed upon.

When consuming the pet treat, the dog sinks its teeth into the rawhide chew and rubs the chew against its gums while savoring the latent flavor. This exercises the dog's teeth, jaws and gums, and also clean the dog's teeth by the abrasive wiping, chewing, and gnawing action of the rawhide pet treat 130 against the surface of the teeth and gums. Tarter or plaque on the pet's teeth is reduced by the action of chewing and rubbing of the chew against the teeth. The dog has a sustained interest in the pet treat and its toy dispenser, resulting in a prolonged chewing time with a beneficial increase in the abrasive effect on the dog's teeth surfaces. This helps control plaque and tartar build-up which can lead to gum disease and bad breath. Also, as the pet treat dispenser of the invention attracts and retains the pet's attention, it reduces a pet's destructive chewing.

Figure 13:
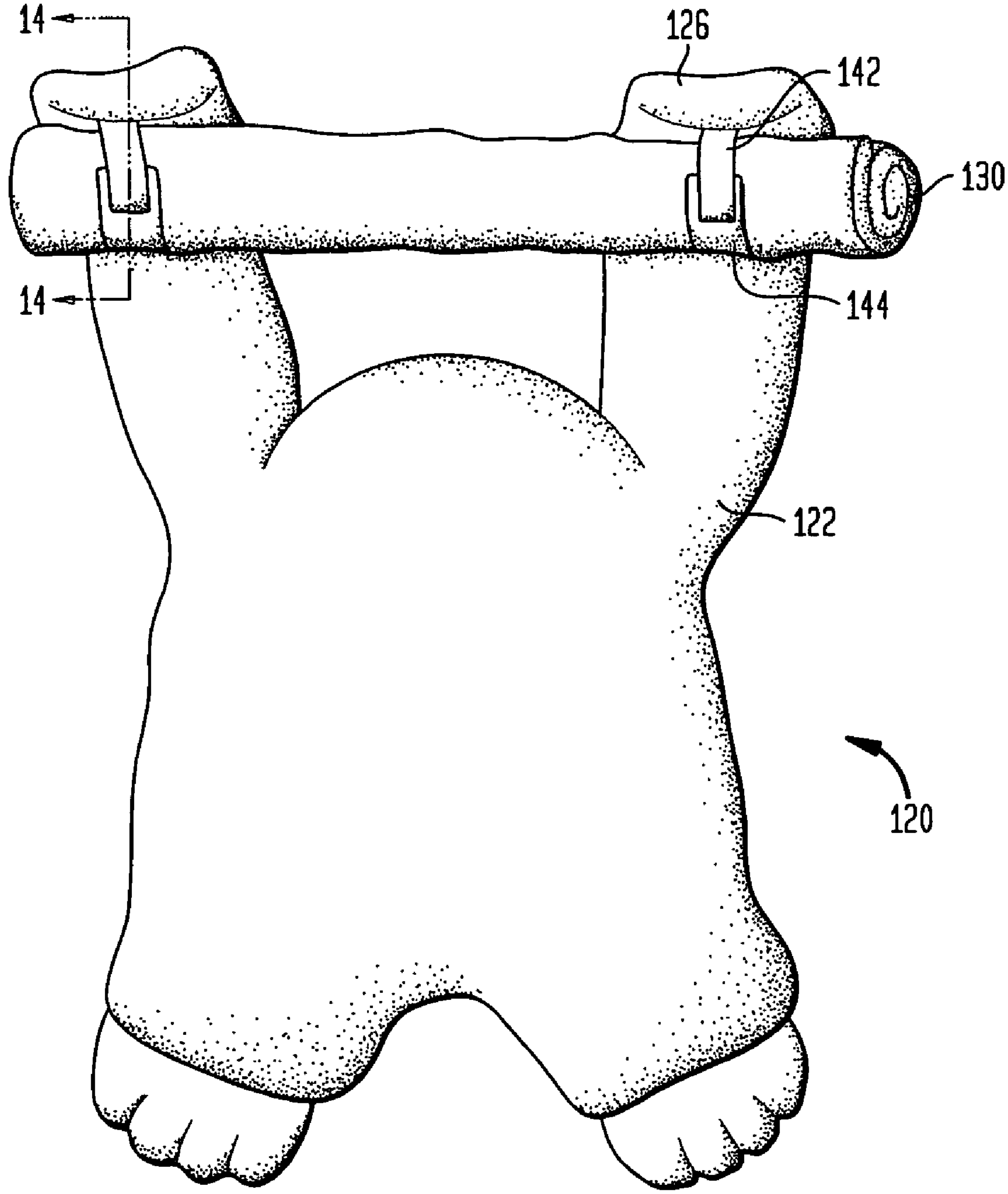
FIG. 13 is a back view of the pet treat dispenser of FIG. 7 showing alternate means for removably attaching a pet treat.
Figure 14:
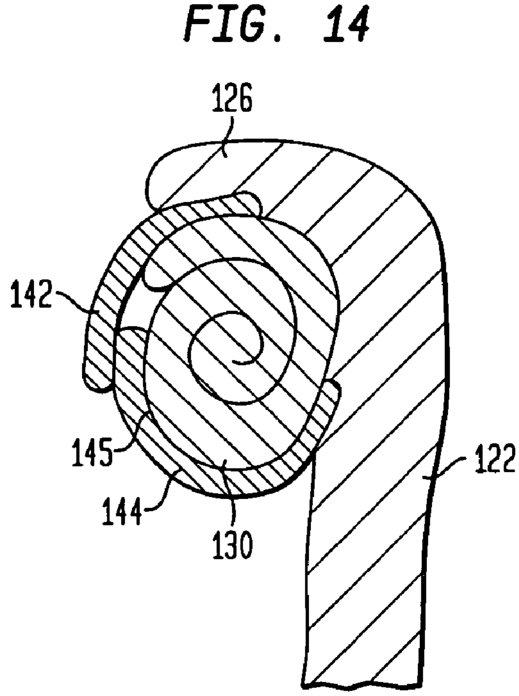
FIG. 14 is a cross-sectional view through lines 14—14 of FIG. 13.
Figure 15:
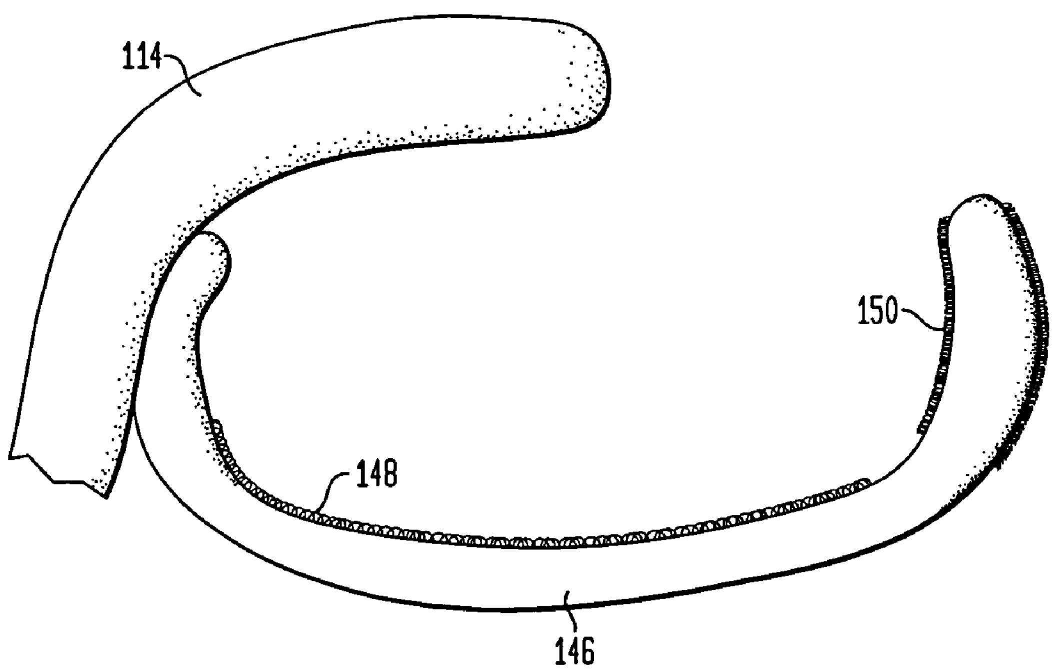
FIG. 15 is a partial view showing another alternate means for removably attaching a pet treat.

Referring to FIGS. 13 through 15, the retaining means may comprise a hook and loop type fastener, such as that sold under the trademark Velcro® or some other such type fastener, having a hook component 142 and a loop 144 component which forms a reattachable connection. A hook and loop type fastener may be used to attach/detach pet treats to the toy or to attach/detach several surfaces of the same article to the toy. The hook component 142 consists of a fabric backing 145 which contains a plurality of tiny, resilient, upstanding hook-shaped elements 150. The loop component 144 of the Velcro® type fastener comprises a fabric backing 145 containing a plurality of upstanding loops 148 on its surface. When the hook component 142 and the loop component 144 are pressed together to close the fastener, the hooks 150 entangle the loops 148 and interlock, thus retaining the pet treat 130 in position. The hooks 150 and loops 148 may be disengaged by gradually peeling the components apart, so that the hooks release the loops, detaching the pet treat 130.

Referring to FIGS. 13 and 14, the toy's right and left hands 126 have strips of mating Velcro® type hook and loop fabric on its palm side. The hook and loop fastener strips are attached by adhesive or stitching. The dimensions of the hook and loop fastener strip will vary depending on the size of the pet chew and the size of the animal. Referring to FIG. 14, the retaining means may comprise one hand with two portions of hook and loop fasteners on it. Alternatively, the retaining means may instead fasten, as shown in FIG. 15, using one long strip of hook and loop fastener attached to the arm of the toy, the fastener having hook components 150 on both sides of the fabric backing 146 so as to wrap around the pet chew at least once to hold it in place. When the hook and loop type fabric strip is folded over onto itself, it forms an interior surface covered with Velcro so that it can be removably attached to itself. Each strip may be folded over on itself to any desired degree depending on how tight or lose the user wants to secure the pet treat.

To provide additional stimulation for the pet, the pet treat dispenser may include a sound means, such as a squeaker or rattle, or other pet attracting means, not shown, which may be located at a location 112 inside the head or body of the plush toy. The sound means preferably emits a sound which is attractive to the pet. In combination with the edible pet treat, the plush toy including sound means provides an attractive pet treat dispenser which is attractive to the pet visually, and which has sustained play value.

It will be understood that the embodiments described herein are merely exemplary and that a person skilled in the art may make many variations and modifications without departing from the spirit and scope of the invention. For instance, the plush toy may take the form of various configurations and sizes, and may represent stuffed animals, or other objects. Rather, the invention as claimed extends to many possible variations not specifically detailed. All such variations and modifications are intended to be included in the scope of the invention as described herein.

We claim:

1. A pet treat dispensing system comprising an edible pet treat comprising a rawhide roll;

a non-edible, interactive pet toy of generally flexible material, said toy comprising a posable toy figure configured and dimensioned as an animal having a body, a head disposed at a top end of said body, a pair of legs extending outwardly from a bottom end of said body, a pair of arms extending outwardly from said body below said head, and a chest area in said body, stuffing means disposed in and filling said toy figure;

a sound means disposed within said toy figure, said sound means sounding a noise when said toy is manipulated;

retaining means mounted to said toy for removably attaching said pet treat to place said treat in an exposed position for easy access by a pet, wherein said treat is kept at a distance from stainable surfaces when said toy is in the upright position, said retaining means comprising at least one elastic treat positioning loop secured to a surface of said arms of said toy and forming a passage through which said treat is passed, said retaining means being adjustable to accommodate, extend about and retain any size pet treat, said at least one elastic treat positioning loop secured to said arms of said toy and engaging said pet treat to hold said treat in an upright position when said pet treat dispensing system is in a use position wherein said treat has a reclining orientation in said upright position, said pet treat disposed at an angle across said body of said toy figure, one end of said pet treat leaning against one leg of said toy figure to stabilize the toy figure in the use position and to assist in supporting the toy in an upright position.

2. The pet treat dispensing system of claim 1 wherein said generally flexible material is a material selected from the group consisting of plush fabric, rubber, and plastic.

3. A pet treat dispensing system comprising an edible pet treat comprising a rawhide roll;

a non-edible, interactive pet toy of generally flexible material, said toy comprising a posable toy figure configured and dimensioned as an animal having a body, a head disposed at a top end of said body, a pair of legs extending outwardly from a bottom end of said body, a pair of arms extending outwardly from said body below said head, and a chest area in said body, stuffing means disposed in and filling said toy figure;

said arms movable between a first position extending downwardly with respect to said head, and a second position extending upwardly from said body;

a sound means disposed within said toy figure, said sound means sounding a noise when said toy is manipulated;

retaining means mounted to said toy for removably attaching said pet treat to place said treat in an exposed position for easy access by a pet, wherein said treat is kept at a distance from stainable surfaces when said toy is in the upright position, said retaining means comprising a releasable fastener comprising at least one strip of hook and loop type fabric, a hook component of said hook and loop type fabric secured to a first surface of said arms of said toy and a disengagable loop component of said hook and loop type fabric secured to a second surface of said arms of said toy, said strip of hook and loop type fabric having a length sufficient to secure a pet treat, whereby when said hook component and said loop component are pressed together they form a hook and loop type fastener to secure said pet treat to said toy.

4. The pet treat dispensing system of claim 3 wherein said generally flexible material is a material selected from the group consisting of plush fabric, rubber, and plastic.

5. A pet treat dispensing system comprising an edible pet treat comprising a rawhide roll;

a non-edible, interactive pet toy of generally flexible material, said toy comprising a posable toy figure configured and dimensioned as an animal having a body, a head disposed at a top end of said body, a pair of legs extending outwardly from a bottom end of said body, a pair of arms extending outwardly from said body below said head, and a chest area in said body, stuffing means disposed in and filling said toy figure;

said arms movable between a first position extending downwardly with respect to said head, and a second position extending upwardly from said body;

a sound means disposed within said toy figure, said sound means sounding a noise when said toy is manipulated;

retaining means mounted to said toy for removably attaching said pet treat to place said treat in an exposed position for easy access by a pet, wherein said treat is kept at a distance from stainable surfaces when said toy is in the upright position, said retaining means comprising a releasable fastener comprising at least one strip of hook and loop type fabric, said fastener secured to a surface of said toy, said fastener comprising a first hook component and an adjacent disengagable loop component for wrapping around a pet treat and removably holding a pet treat, said strip of hook and loop type fabric having a length sufficient to secure a pet treat, whereby when said hook component and said loop component are pressed together they form a hook and loop type fastener to secure said pet treat to said toy.

6. The pet treat dispensing system of claim 5 wherein said generally flexible material is a material selected from the group consisting of plush fabric, rubber, and plastic.

* * * * *